(12) United States Patent
You

(10) Patent No.: US 8,264,784 B2
(45) Date of Patent: Sep. 11, 2012

(54) OPTICAL SYSTEM

(75) Inventor: Ho Sik You, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/929,370

(22) Filed: Jan. 19, 2011

(65) Prior Publication Data

US 2011/0310495 A1  Dec. 22, 2011

(30) Foreign Application Priority Data

Jun. 17, 2010 (KR) .................. 10-2010-0057658

(51) Int. Cl.
*G02B 9/34* (2006.01)
(52) U.S. Cl. ...................................... 359/773
(58) Field of Classification Search ............. 359/773, 359/771, 772
See application file for complete search history.

(56) References Cited

U.S. PATENT DOCUMENTS

| 6,476,982 | B1 | 11/2002 | Kawakami | |
|---|---|---|---|---|
| 7,535,658 | B2 | 5/2009 | Taniyama | |
| 7,965,455 | B2 * | 6/2011 | Okano | 359/773 |
| 2008/0180816 | A1 | 7/2008 | Nakamura | |

FOREIGN PATENT DOCUMENTS

| KR | 10-2007-0082554 | 8/2007 |
|---|---|---|
| KR | 10-2009-0115556 | 11/2009 |

OTHER PUBLICATIONS

German Office Action issued Jul. 20, 2011 in corresponding German Patent Application 10 2011 008 994.2.
Korean Office Action issued Feb. 27, 2012 in corresponding Korean Patent Application No. 10-2010-0057658.

* cited by examiner

*Primary Examiner* — Jack Dinh

(57) ABSTRACT

There is provided an optical system configured of 4-sheet lenses to have a wide angle of view. The optical system includes: a first lens having a positive refractive power, with both surfaces being convex; a second lens having a negative refractive power, with both surfaces thereof being concave; a third lens having a positive refractive power and a meniscus shape; and a fourth lens having a negative refractive power, with both surfaces thereof being concave, all of which are disposed in order from an object to a front upper surface. In the optical system, the refractive powers of the first lens to the fourth lens satisfy the following Conditional Expression 1.

$$\frac{f1}{f4} < -1.1 \qquad \text{Conditional Expression 1}$$

In Conditional Expression, f1: a focal distance of the first lens and f4: a focal distance of the fourth lens.

6 Claims, 12 Drawing Sheets

OPTICAL SYSTEM

CROSS-REFERENCE TO RELATED APPLICATIONS

This application claims the priority of Korean Patent Application No. 10-2010-0057658 filed on Jun. 17, 2010, in the Korean Intellectual Property Office, the disclosure of which is incorporated herein by reference.

BACKGROUND OF THE INVENTION

1. Field of the Invention

The present invention relates to an optical system, and more particularly, to an optical system configured of 4-sheet lenses to have a wide angle of view by being mounted on mobile communications terminals, PDAs, or the like, or used in a monitoring camera and a digital camera, or the like.

2. Description of the Related Art

Recently, research into a camera module for a communications terminal in connection with an optical system, a digital still camera (DSC), a camcoder, a PC camera (an optical device attached to a personal computer), or the like, has been conducted. In the image pickup system, the most important component, in order to obtain images, is a lens system forming images, that is, an optical system.

Since the optical system requires high performance in terms of resolution, quality of image, and the like, the configuration of the lens is complicated. The size of the optical system is increased when the optical system is structurally or optically complicated, such that there is a problem in realizing compactness and slimness in the optical system.

For example, in order to increase the mounting effectiveness of a camera module mounted on a mobile phone, the compactness of the entire module is an indispensable condition. In addition, in an image sensor of a CCD or a CMOS used therefor, resolution is gradually being increased and the size of the pixels is gradually being reduced. The lens system corresponding thereto is therefore required to have slimness and compactness as well as being able to satisfy the requirements for high resolution and excellent optical performance, and the like.

In this case, when a 3-megapixel optical device (CCD or CMOS) is used, optical performance and compactness can be satisfied even in the case that lenses configuration of 3 sheets or less are used; however, in the case that lenses of 3 sheets or less are used in a high-resolution optical device (CCD or CMOS) of 5-megapixels or more, the refractive powers of each lens are large and thus, the lenses cannot be easily processed, such that it is difficult to simultaneously satisfy the requirements of high performance and compactness. In addition, despite having a lens configuration of 4 sheets or more, the entire length of an optical system is increased when a spherical lens is used, such that it is difficult manufacture to have a small size. In addition, an optical system having a 4-sheet lens configuration can secure good optical characteristics when it is generally designed to have an angle of view of 55 to 68°; however, a degradation in yield due to the increase in sensitivity is caused when it is designed to have the angle of view of 68° or more.

Therefore, in an optical system having a 4-sheet lens configuration, a need exists for a technology capable of simultaneously implementing compactness, high optical performance, and a wide angle of view.

SUMMARY OF THE INVENTION

An aspect of the present invention provides an optical system having a 4-sheet lens configuration having a wide angle of view while implementing compactness and maintaining good optical performance such as aberrations and telecentric characteristics.

According to an aspect of the present invention, there is provided an optical system, including: a first lens having positive refractive power, with both surfaces thereof being convex; a second lens having negative refractive power, with both surfaces thereof being concave; a third lens having positive refractive power and a meniscus shape; and a fourth lens having negative refractive power, with both surfaces thereof being concave, all of which are disposed in order from an object to a front upper surface, wherein the refractive powers of the first lens to the fourth lens satisfy the following Conditional Expression 1.

$$\frac{f1}{f4} < -1.1 \qquad \text{Conditional Expression 1}$$

In Conditional Expression 1, f1 represents a focal distance of the first lens and f4 represents a focal distance of the fourth lens.

The shapes of the first lens and the third lens may satisfy the following Conditional Expression 2.

$$\frac{r1}{r6} < -2.0 \qquad \text{Conditional Expression 2}$$

In Conditional Expression 2, r1 represents a curvature radius of the object surface of the first lens and r6 represents a curvature radius of the upper side of the third lens.

The shape of the third lens may satisfy the following Conditional Expression 3.

$$\frac{t5}{F} > 0.2 \qquad \text{Conditional Expression 3}$$

In Conditional Expression 3, t5 represents a thickness of an optical axis of the third lens and F represents the entire focal distance of the optical system.

The materials of the first lens and the second lens may satisfy the following Conditional Expression 4.

$$V1-V2>25 \qquad \text{Conditional Expression 4}$$

In Conditional Expression 4, V1 represents Abbe's number with relation to the first lens and V2 represents Abbe's number with relation to the second lens.

The refractive powers of the first lens and the fourth lens may satisfy the following Conditional Expressions 5 to 8.

$$0.4 < \frac{f1}{F} < 1.0 \qquad \text{Conditional Expression 5}$$

$$-1.5 < \frac{f2}{F} < -0.7 \qquad \text{Conditional Expression 6}$$

$$0.1 < \frac{f3}{F} < 0.7 \qquad \text{Conditional Expression 7}$$

$$-0.7 < \frac{f4}{F} < -0.1 \qquad \text{Conditional Expression 8}$$

In Conditional Expressions 5 to 8, f1 represents a focal distance of the first lens, f2 represents a focal distance of the second lens, f3 represents a focal distance of the third lens, f4 represents a focal distance of the fourth lens, and F represents the entire focal distance of the optical system.

The optical system may further include an aperture stop disposed in front of the object of the first lens.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
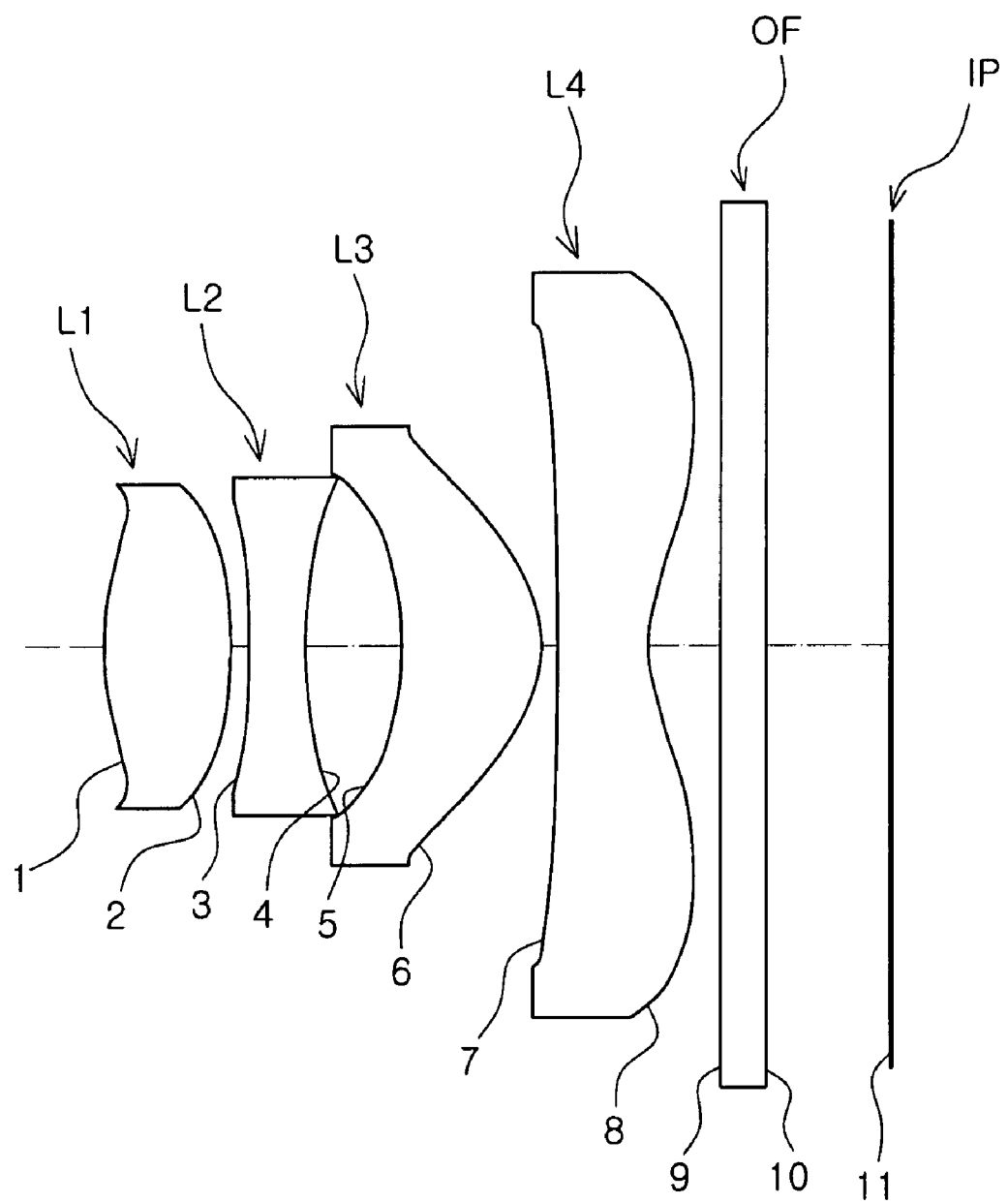
FIG. 1 is a lens configuration diagram of an optical system according to a first exemplary embodiment of the present invention.

Hereinafter, various exemplary embodiments of the present invention will be described with reference to the accompanying drawings. However, the exemplary embodiments of the present invention may be modified in many different forms and the scope of the invention should not be limited to the embodiments set forth herein. Rather, these exemplary embodiments are provided so that this disclosure will be thorough and complete, and will fully convey the scope of the invention to those skilled in the art. Therefore, it is to be noted that the shape and size of components shown in the drawings can be exaggerated in order to provide more clear description.

FIG. 1 is a lens configuration diagram of an optical system according to a first exemplary embodiment of the present invention. In the following lens configuration diagram, the thickness, size, and shape of the lenses may be exaggerated for description. In particular, the shape of the spherical surface or non-spherical surface shown in the lens configuration diagram is shown by way of example and is not limited thereto.

Generally, a camera module may be configured to include at least one lens, a housing having a predetermined space therein to receive a lens, an image sensor corresponding to an image forming surface by the lens, and a circuit board that is fixedly installed on the other end of the housing and has the image sensor on one surface thereof to process the images sensed in the image sensor, or the like.

The present invention relates to an optical system used for a micro camera module among these camera modules.

As shown in FIG. 1, the optical system according to an exemplary embodiment of the present invention may be configured to include a first lens L1 having positive refractive power, with both surfaces 1 and 2 thereof being convex, a second lens L2 having negative refractive power, with both surfaces 3 and 4 thereof being concave, a third lens L3 having positive refractive power and a meniscus shape, and a fourth lens L4 having negative refractive power, with both surfaces 7 and 8 thereof being concave. In addition, the optical system according to the exemplary embodiment of the present invention may further include an aperture stop (not shown) disposed at the front of an object of the first lens L1.

In the lens configuration, four lenses are disposed to sequentially have the positive, negative, positive, and negative refractive forces from the object to appropriately distribute the refractive force, thereby making the optical system compact.

The first lens L1 disposed at the nearest side of the object has positive refractive power due to both surfaces 1 and 2 thereof being formed in a convex shape, thereby adjusting the entire refractive power of the optical system at the object of the optical system.

The second lens L2 has the upper side 4 thereof formed in a concave shape by using a material having a relatively large variance value (i.e., a small Abbe's number) to have negative refractive power, such that the third lens L3 and the fourth lens L4 disposed subsequent to the second lens L2 can compensate for chromatic dispersion.

The third lens L3 has the meniscus shape in which the upper side 6 thereof is convex to input light passing through the second lens L2 disposed in front of the third lens L3 at a small incident angle and expands the lens surface thereof, thereby making it possible to improving aberrations so as not to overlap with each other in each field. In addition, the third lens L3 is configured to have the upper side 6 whose curvature radius is small, thereby making it possible to secure telecentric characteristics and degrade sensitivity even in the wide angle of view.

The fourth lens L4 disposed at the uppermost side is formed to have a concave upper side and a non-spherical surface having a turning point, thereby reducing the incident angle of light incident on the upper surface IP. As a result, the fourth lens L4 can obtain images having an excellent image quality with the reduced aberrations even in the image sensor having a small pixel size. Further, the fourth lens L4 has the upper side 8 formed in a concave shape so that it can shorten a back focus without being largely protruded upward, thereby making it possible to shorten the entire length of the optical lens. In addition, the fourth lens L4 has a short focal distance, such that it can secure telecentric characteristics and degrade the sensitivity even in the wide angle of view, together with the upper side 6 of the third lens L3 having a small curvature radius.

The refractive surfaces 1 to 8 of the first lens L1 to the fourth lens L4 are formed in a non-spherical surface to improve the resolution of the lens and reduce distortion aberrations and spherical aberrations, thereby making it possible to implement the compact optical system with the excellent optical characteristics.

Further, the present invention disposes the aperture stop in front of the object of the first lens L1 to make the area of the lens surface exposed from the object side small, thereby easily managing the permeation of foreign objects, or the like, and the starting point of the angle of view is disposed to be adjacent to the uppermost surface of the lens, thereby making it possible to make the window of the external fixing member fix the compact camera module. In addition, the pixel size of the image sensor is further reduced as it is used for high resolution, such that much brighter optical system (a lens having a small F number) is required. Meanwhile, a diaphragm is disposed in front of an object to easily manufacture the bright optical system.

Further, an infrared filter, an optical filter (OF) corresponding to a cover glass, or the like, may be provided between the fourth lens L4 and the upper surface IP.

In addition, the upper surface (IP) corresponds to an image forming surface of the image sensors such as CCD, CMOS, and the like.

Under the entire lens configuration, the effects of the following conditional Expressions 1 to 8 will be described.

$$\frac{f1}{f4} < -1.1 \qquad \text{Conditional Expression 1}$$

In Conditional Expression 1, f1 represents a focal distance of the first lens L1 and f4 represents a focal distance of the fourth lens L4.

Conditional Expression 1 represents a ratio of the focal distance of the first lens L1 to the focal distance of the fourth lens L4 and defines the conditions associated with the refractive forces of the first lens L1 and the fourth lens L4.

The case of deviating from the upper limit defined in Conditional Expression 1 corresponds to the case of forming the relatively large focal distance of the fourth lens L4. In this case, the telecentric characteristics and the chromatic aberration characteristics are deteriorated and the sensitivity is increased.

$$\frac{r1}{r6} < -2.0 \qquad \text{Conditional Expression 2}$$

In Conditional Expression 2, r1 represents the curvature radius of the surface of the object of the first lens L1 and r6 represents the curvature radius of the upper side of the third lens L3.

Conditional expression 2 represents a ratio of the curvature radius of the surface of the object of the first lens L1 to the curvature radius of the upper side of the third lens L3 and defines the conditions associated with the shapes of the first lens L1 and the fourth lens L4.

The case of deviating from the upper limit defined in the above Conditional Expression 2 corresponds to the case of forming the relatively large curvature radius of upper side of the third lens L3. Similar to the case of deviating from the upper limit defined in Conditional Expression 1, the telecentric characteristics and the chromatic aberration characteristics of the optical system are deteriorated and the sensitivity is increased.

$$\frac{t5}{F} > 0.2 \qquad \text{Conditional Expression 3}$$

In Conditional Expression 3, t5 represents the thickness of the optical axis, of the third lens L3 and F represents the entire focal distance of the optical system.

Conditional Expression 3 represents the ratio of the thickness of the third lens L3 to the entire focal distance and defines the conditions associated with the shape of the third lens L3.

In the case of deviating from the lower limit defined in Conditional Expression 3, the thickness of the third lens L3 is thin, such that it is difficult to maintain the sufficiently small curvature radius of upper side of the third lens L3, thereby deteriorating the telecentric characteristics and the chromatic aberration characteristics and increasing the sensitivity thereof.

$$V1 - V2 > 25 \qquad \text{Conditional Expression 4}$$

In Conditional Expression 4, V1 represents an Abbe's number with relation to the first lens L1 and V2 represents an Abbe's number with relation to the second lens L2.

Conditional Expression 4 defines the conditions associated with the material of the first lens L1 and the second lens. The case of deviating from the lower limit of Conditional Expression 4 corresponds to the case of forming the relatively large Abbe's number of the second lens L2 (small variance value), such that it may be difficult to correct the chromatic dispersion.

$$0.4 < \frac{f1}{F} < 1.0 \qquad \text{Conditional Expression 5}$$

$$-1.5 < \frac{f2}{F} < -0.7 \qquad \text{Conditional Expression 6}$$

$$0.1 < \frac{f3}{F} < 0.7 \qquad \text{Conditional Expression 7}$$

$$-0.7 < \frac{f4}{F} < -0.1 \qquad \text{Conditional Expression 8}$$

In Conditional Expressions 5 to 8, f1 represents the focal distance of the first lens L1, f2 represents the focal distance of the second lens L2, f3 represents the focal distance of the third lens L3, f4 represents the focal distance of the fourth lens L3, and F represents the entire focal distance of the optical system.

Conditional Expressions 5 to 8 each define the conditions associated with the refractive powers of the first lens L1 to the fourth lens L4.

When deviating from the lower limit defined in Conditional Expressions 5 to 8, it is difficult to correct spherical aberration or distortion aberration and telecentric characteristics may therefore be degraded. When deviating from the upper limit, the chromatic aberration is increased, such that it is difficult to correct the chromatic aberration and it is difficult to make the optical system compact.

The present invention will now be described with reference to a detailed example of numerical values.

As described above, the exemplary embodiments 1 to 3 include a first lens L1 having positive refractive power, with both surfaces being convex, a second lens L2 having negative refractive power, with both surfaces thereof being concave, a third lens L3 having positive refractive power and a meniscus shape, and a fourth lens L4 having a negative refractive power, with both surfaces thereof being concave, wherein an aperture stop S is provided in front of the object of the first lens L1. In addition, an infrared filter, an optical filter OF corresponding to a cover glass, or the like, may be provided between the fourth lens L4 and the upper surface IP. In addition, the upper surface IP corresponds to the image forming surface of the image sensor such as the CCD, CMOS, or the like.

The non-spherical surface used in each of the following exemplary embodiments is obtained from the known Equation 1, wherein a conic constant K and 'E and numbers subsequent thereto' used in non-spherical coefficients A, B, C, D, E, and F represents a power of 10. For example, E+01 represents $10^1$ and E−02 represents $10^{-2}$.

$$Z = \frac{cY^2}{1 + \sqrt{1 - (1+K)c^2Y^2}} + AY^4 + BY^6 + CY^8 + DY^{10} + EY^{12} + FY^{14} + \ldots \quad \text{Equation 1}$$

Figure 2:
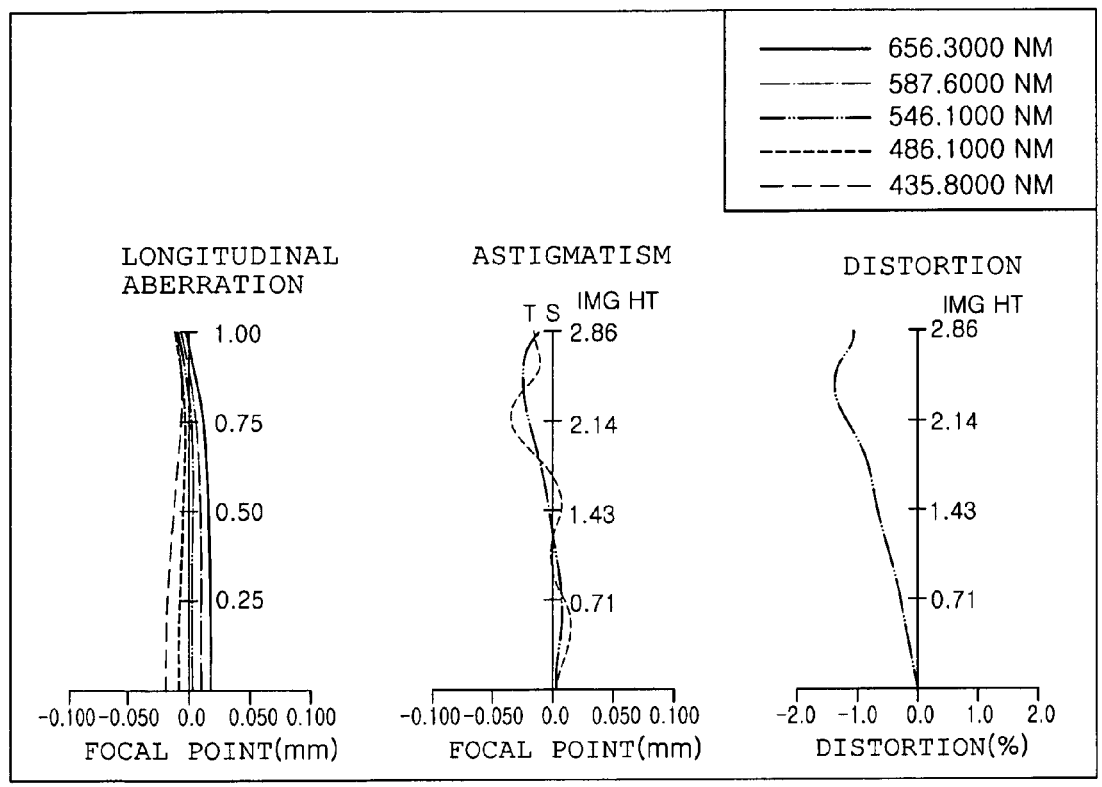
FIG. 2 is a graph analyzing longitudinal spherical aberrations, astigmatisms, and distortions of the optical system shown in FIG. 1.
Figure 3:
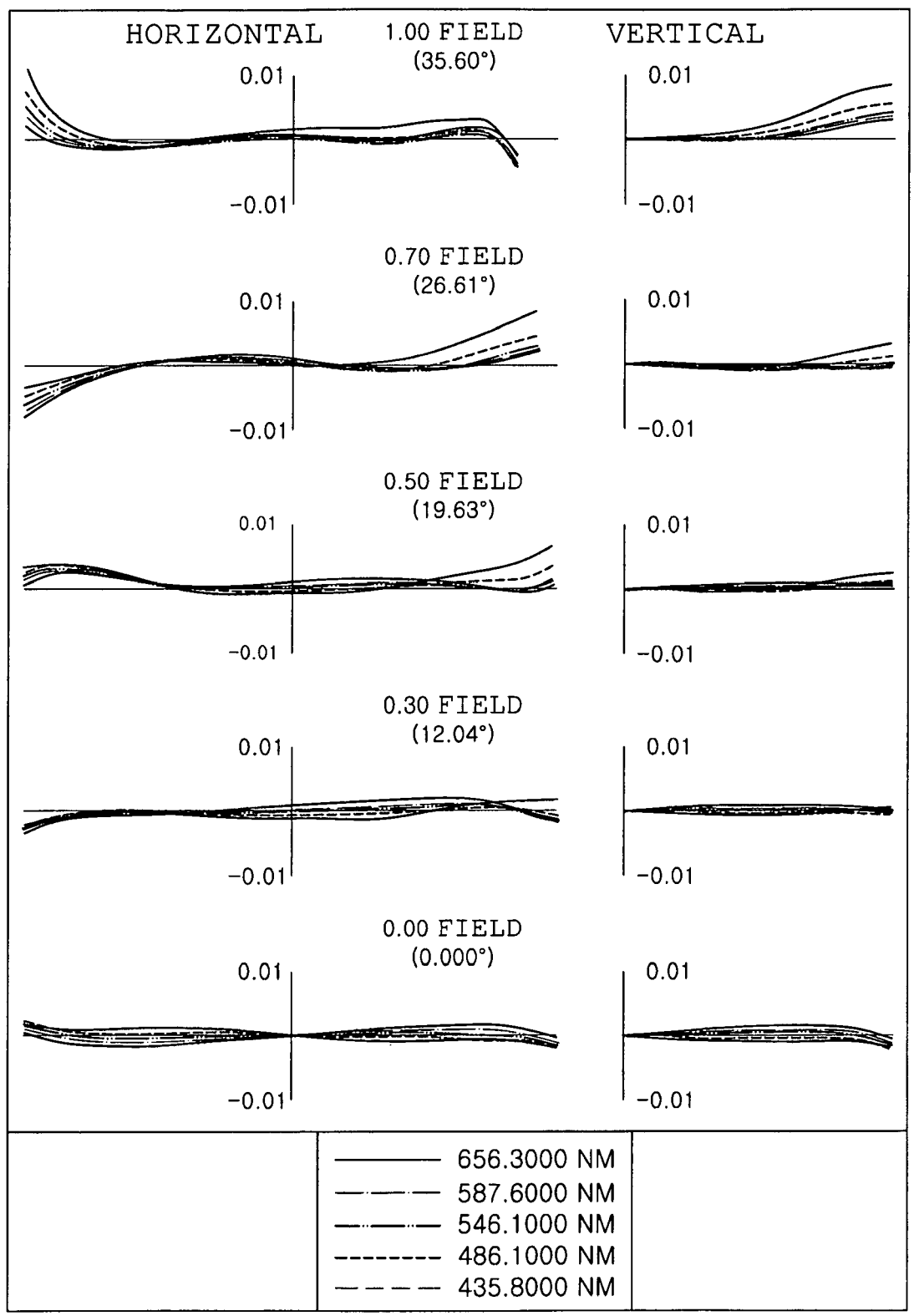
FIG. 3 is a graph analyzing transverse aberrations in a region in which a relative field height is 0.0 to 1.0 on an optical axis in tangential field curvature and a sagittal field curvature of the optical system shown in FIG. 1.

Z: Distance to an optical axis direction from an apex of a lens
Y: Distance in a direction vertical to an optical axis
c: Reciprocal number of a curvature radius r from at an apex of a lens
K: Conic constant
A,B,C,D,E,F: Non-spherical coefficient -First Exemplary Embodiment- The following Table 1 represents an example of the numerical value of an optical system according to a first exemplary embodiment. In addition, FIG. 1 is a lens configuration diagram of an optical system according to a first exemplary embodiment of the present invention, FIG. 2 is a graph analyzing longitudinal spherical aberrations, astigmatisms, and distortions of the optical system shown in Table 1 and FIG. 1, and FIG. 3 is a graph analyzing transverse aberrations in a region in which a relative field height is 0.0 to 1.0 on an optical axis in tangential field curvature and a sagittal field curvature of the optical system shown in Table 1 and FIG. 1.

In the case of the first exemplary embodiment, a distance TL from the surface 1 of the object of the first lens L1 to an upper surface 11 represents 5.25 mm, the entire focal distance F1 of the optical system represents 4.0437 mm, the focal distances f1, f2, f3, and f4 between the first lens L1 to the fourth lens L4 each represent 2.965 mm, −4.963 mm, 1.790 mm, and −1.801 mm.

TABLE 1

| Surface Number | Curvature Radius (rn) | Thickness or Distance (t) | Refractive Index (Nd) | Abbe's Number (Vd) | Remarks |
|---|---|---|---|---|---|
| 1 | 2.1663 | 0.840 | 1.5346 | 56.2727 | First Lens |
| 2 | −5.1113 | 0.120 | | | |
| 3 | −120.8408 | 0.380 | 1.6142 | 25.602 | Second Lens |
| 4 | 3.1308 | 0.607 | | | |
| 5 | −2.2469 | 0.950 | 1.5346 | 56.2727 | Third Lens |
| 6 | −0.7701 | 0.100 | | | |
| 7 | −50.0000 | 0.620 | 1.5346 | 56.2727 | Fourth Lens |
| 8 | 0.9862 | 0.500 | | | |
| 9 | ∞ | 0.300 | 1.5168 | 64.1973 | Optical Filter |
| 10 | ∞ | 0.833 | | | |
| 11 | ∞ | 0 | | | Upper Surface |

The non-spherical coefficient values of the first exemplary embodiment according to Equation 1 depend on the follow Table 2.

-Second Exemplary Embodiment-

Figure 4:
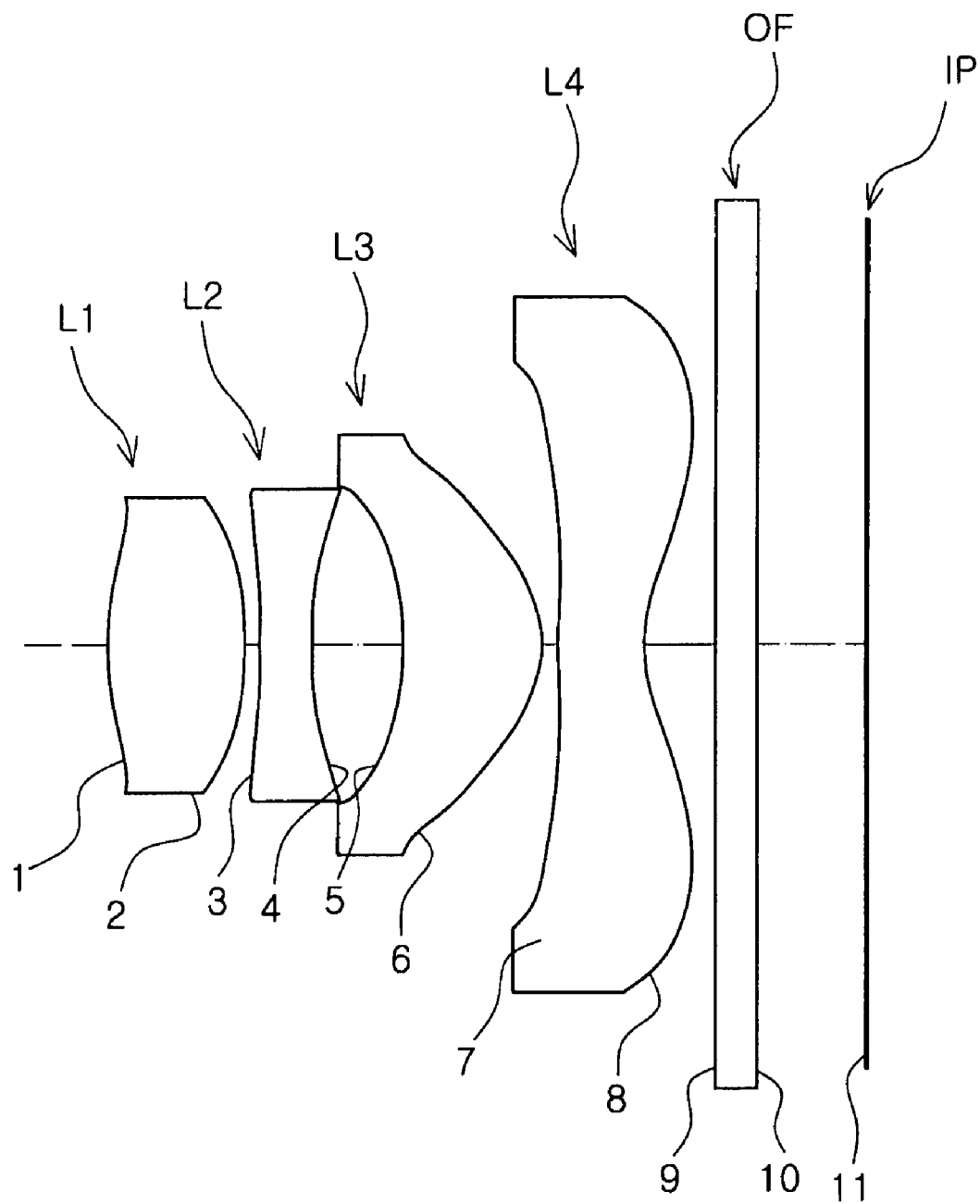
FIG. 4 is a lens configuration diagram of an optical system according to a second exemplary embodiment of the present invention.
Figure 5:
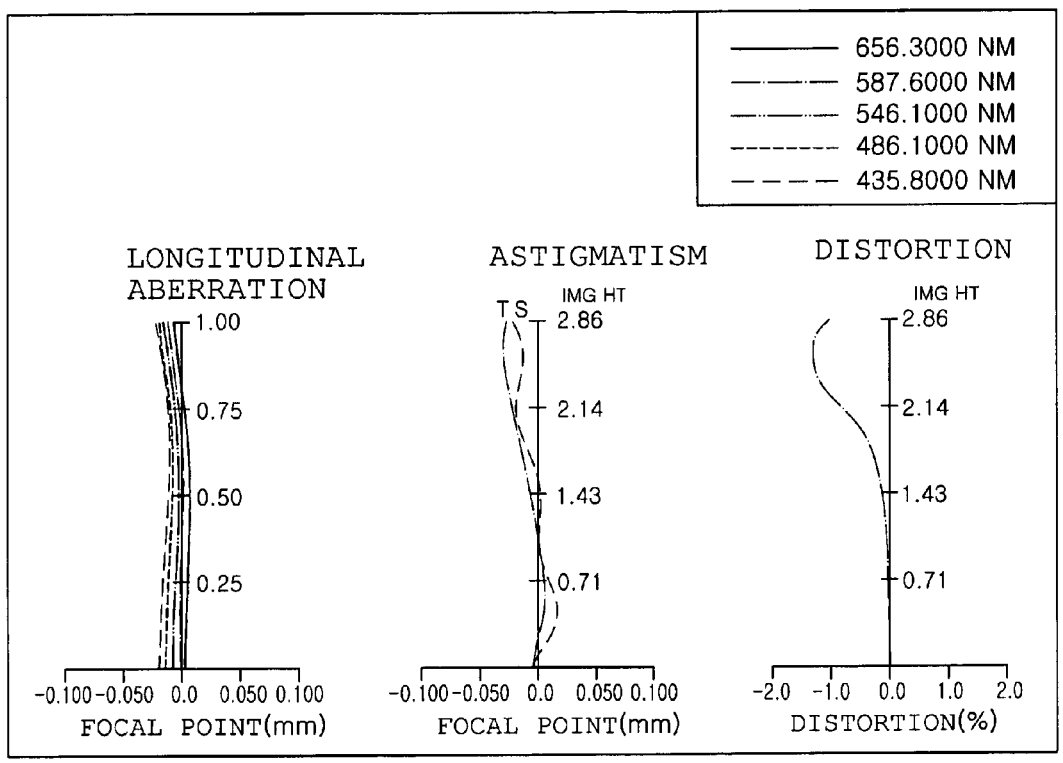
FIG. 5 is a graph analyzing longitudinal spherical aberrations, astigmatisms, and distortions of the optical system shown in FIG. 4.
Figure 6:
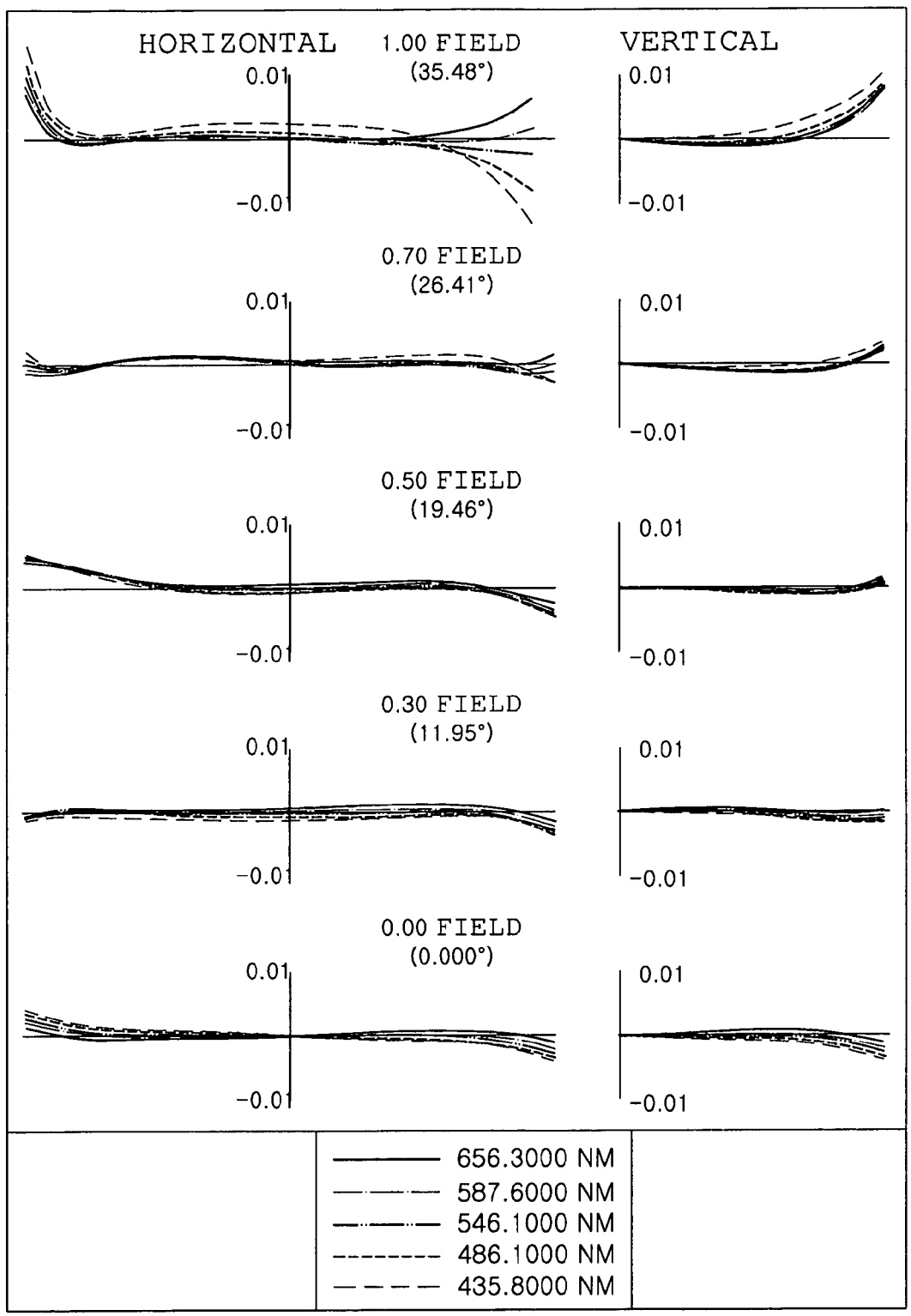
FIG. 6 is a graph analyzing transverse aberrations in a region in which a relative field height is 0.0 to 1.0 on an optical axis in tangential field curvature and a sagittal field curvature of the optical system shown in FIG. 4.

The following Table 3 represents an example of the numerical value of an optical system according to a second exemplary embodiment. In addition, FIG. 4 is a lens configuration diagram of an optical system according to a second exemplary embodiment of the present invention, FIG. 5 is a graph analyzing longitudinal spherical aberrations, astigmatisms, and distortions of the optical system shown in Table 3 and FIG. 4, and FIG. 6 is a graph analyzing transverse aberrations in a region in which a relative field height is 0.0 to 1.0 on an optical axis in tangential field curvature and a sagittal field curvature of the optical system shown in Table 3 and FIG. 4.

In the case of the second exemplary embodiment, a distance TL from the surface 1 of the object of the first lens L1 to an upper surface 11 represents 5.447 mm, the entire focal distance of the optical system represents 4.0465 mm, the focal distances f1, f2, f3, and f4 between the first lens L1 to the fourth lens L4 each represent 2.771 mm, −4.266 mm, 1.830 mm, and −1.828 mm.

TABLE 3

| Surface Number | Curvature Radius (rn) | Thickness or Distance (t) | Refractive Index (Nd) | Abbe's Number (Vd) | Remarks |
|---|---|---|---|---|---|
| 1 | 2.6404 | 0.980 | 1.5346 | 56.27 | First Lens |
| 2 | −2.9373 | 0.100 | | | |
| 3 | −29.0558 | 0.380 | 1.6142 | 25.60 | Second Lens |
| 4 | 2.8940 | 0.650 | | | |
| 5 | −2.5578 | 1.000 | 1.5346 | 56.27 | Third Lens |
| 6 | −0.8039 | 0.100 | | | |
| 7 | −100.0000 | 0.635 | 1.5346 | 56.27 | Fourth Lens |
| 8 | 0.9891 | 0.500 | | | |
| 9 | ∞ | 0.300 | 1.5168 | 64.20 | Optical Filter |
| 10 | ∞ | 0.802 | | | |
| 11 | ∞ | 0 | | | Upper Surface |

The non-spherical coefficient values of the second exemplary embodiment according to Equation 1 depend on the follow Table 4.

TABLE 2

| Surface Number | K | A | B | C | D | E | F |
|---|---|---|---|---|---|---|---|
| 1 | −2.83437 | 1.15547E−02 | −1.90633E−02 | −4.41252E−02 | 3.49129E−02 | −4.62850E−02 | |
| 2 | −2.77307 | −1.48383E−01 | 1.55090E−03 | 6.30163E−03 | −5.88292E−03 | | |
| 3 | 0.00000 | −1.51199E−01 | −1.85200E−02 | 8.33353E−02 | −8.13152E−19 | | |
| 4 | 0.00000 | −1.87217E−02 | −1.85219E−02 | 2.54771E−02 | | | |
| 5 | 1.00000 | −1.59937E−02 | 1.64104E−02 | −1.34077E−02 | −1.28066E−02 | | |
| 6 | −3.24040 | −1.58323E−01 | 1.24400E−01 | −7.33125E−02 | 1.94466E−02 | −3.41925E−04 | |
| 7 | 1.00000 | 8.77596E−04 | −9.07328E−03 | 3.80491E−03 | −4.46109E−04 | | |
| 8 | −7.41988 | −5.55516E−02 | 1.98378E−02 | −5.61647E−03 | 8.52204E−04 | −5.23405E−05 | |

TABLE 4

| Surface Number | K | A | B | C | D | E | F |
|---|---|---|---|---|---|---|---|
| 1 | −3.97750 | 1.04315E−03 | −2.10753E−02 | −1.79186E−02 | 6.67002E−03 | −9.74010E−03 | |
| 2 | −4.12795 | −1.06764E−01 | 4.90813E−02 | −3.51543E−02 | 8.97391E−03 | | |
| 3 | 0.00000 | −1.13359E−01 | 6.99983E−02 | −5.20163E−03 | 6.37002E−03 | | |
| 4 | 0.00000 | −4.59806E−02 | 2.05554E−02 | −7.74182E−04 | | | |
| 5 | 3.62273 | −1.61950E−02 | 4.44399E−02 | −5.99195E−02 | 2.88550E−02 | | |
| 6 | −3.35511 | −1.50839E−01 | 1.13981E−01 | −7.47236E−02 | 2.14773E−02 | −1.23153E−03 | |
| 7 | 0.00000 | 5.99204E−04 | −1.67465E−02 | 6.45185E−03 | −7.86652E−04 | | |
| 8 | −6.83061 | −4.42967E−02 | 1.25767E−02 | −3.48443E−03 | 5.22201E−04 | −3.30289E−05 | |

-Third Exemplary Embodiment-

Figure 7:
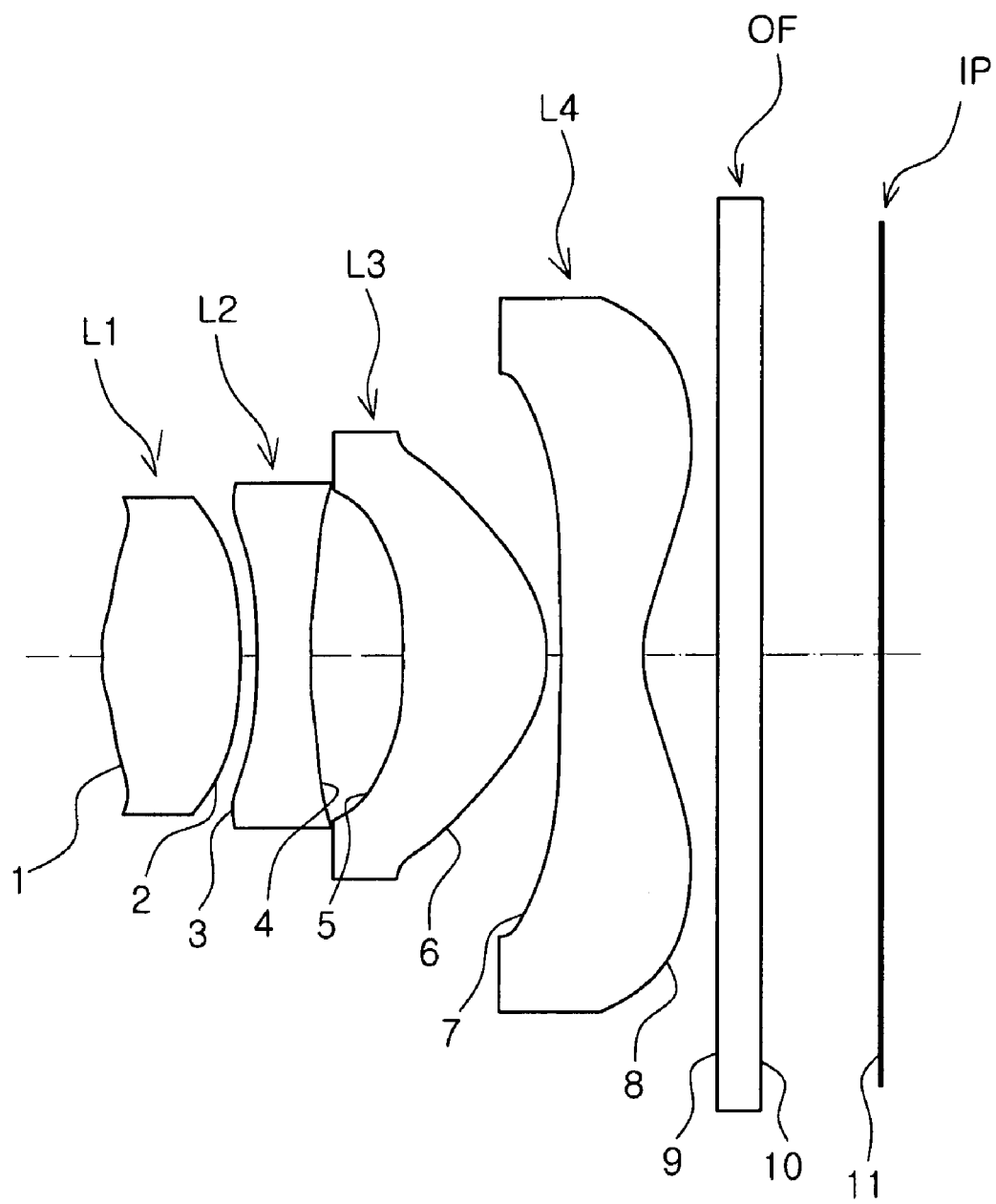
FIG. 7 is a lens configuration diagram of an optical system according to a third exemplary embodiment of the present invention.
Figure 8:
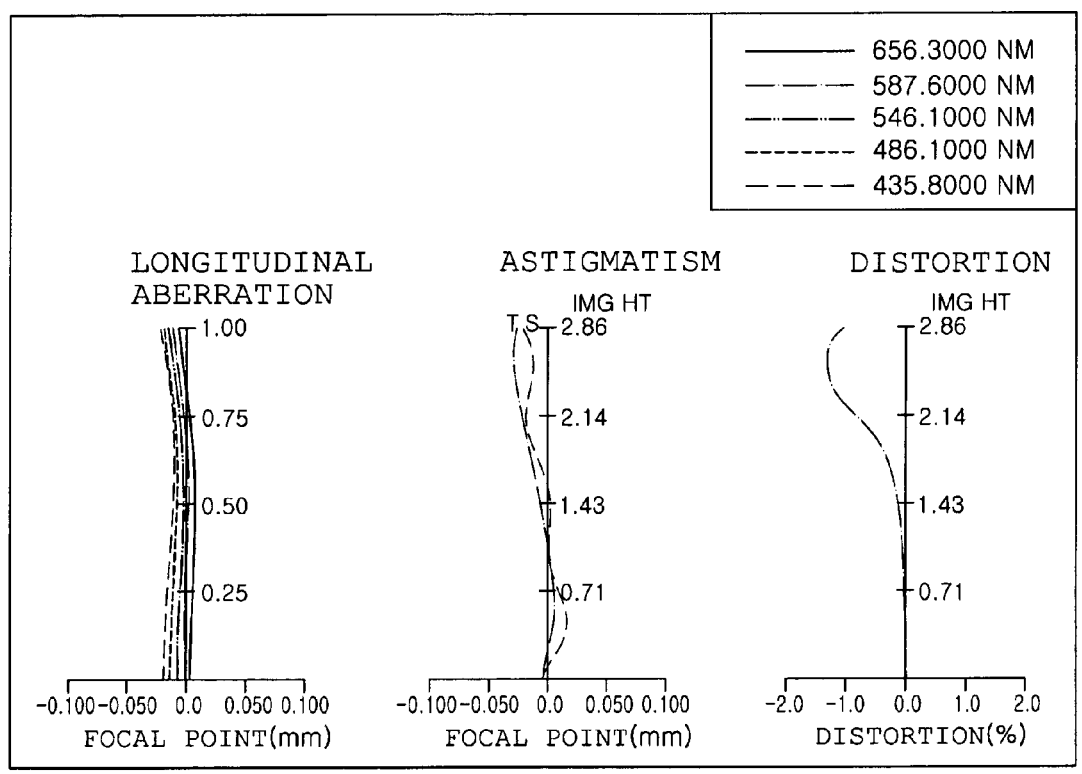
FIG. 8 is a graph analyzing longitudinal spherical aberrations, astigmatisms, and distortions of the optical system shown in FIG. 7.
Figure 9:
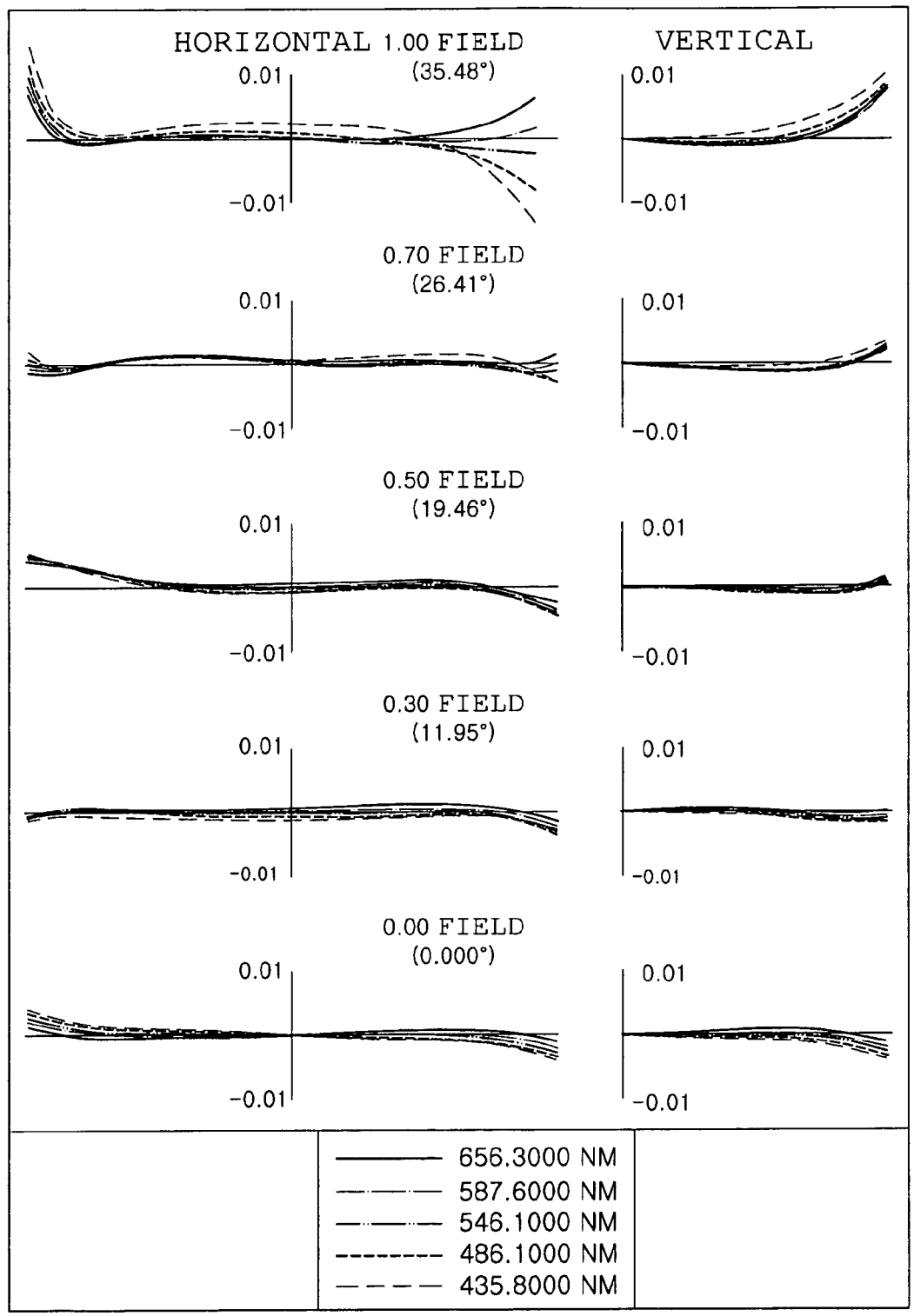
FIG. 9 is a graph analyzing transverse aberrations in a region in which a relative field height is 0.0 to 1.0 on an optical axis in tangential field curvature and a sagittal field curvature of the optical system shown in FIG. 7.

The following Table 5 represents an example of numerical value of an optical system according to a third exemplary embodiment. In addition, FIG. 7 is a lens configuration diagram of an optical system according to a third exemplary embodiment of the present invention, FIG. 8 is a graph analyzing longitudinal spherical aberrations, astigmatisms, and distortions of the optical system shown in Table 5 and FIG. 7, and FIG. 9 is a graph analyzing transverse aberrations in a region in which a relative field height is 0.0 to 1.0 on an optical axis in tangential field curvature and a sagittal field curvature of the optical system shown in Table 5 and FIG. 7.

In the case of the third exemplary embodiment, a distance TL from the surface 1 of the object of the first lens L1 to an upper surface 11 represents 5.400 mm, the entire focal distance F of the optical system represents 4.137 mm, the focal distances f1, f2, f3, and f4 between the first lens L1 to the fourth lens L4 each represent 2.910 mm, −4.733 mm, 1.769 m, and −1.741 mm.

-Fourth Exemplary Embodiment-

Figure 10:
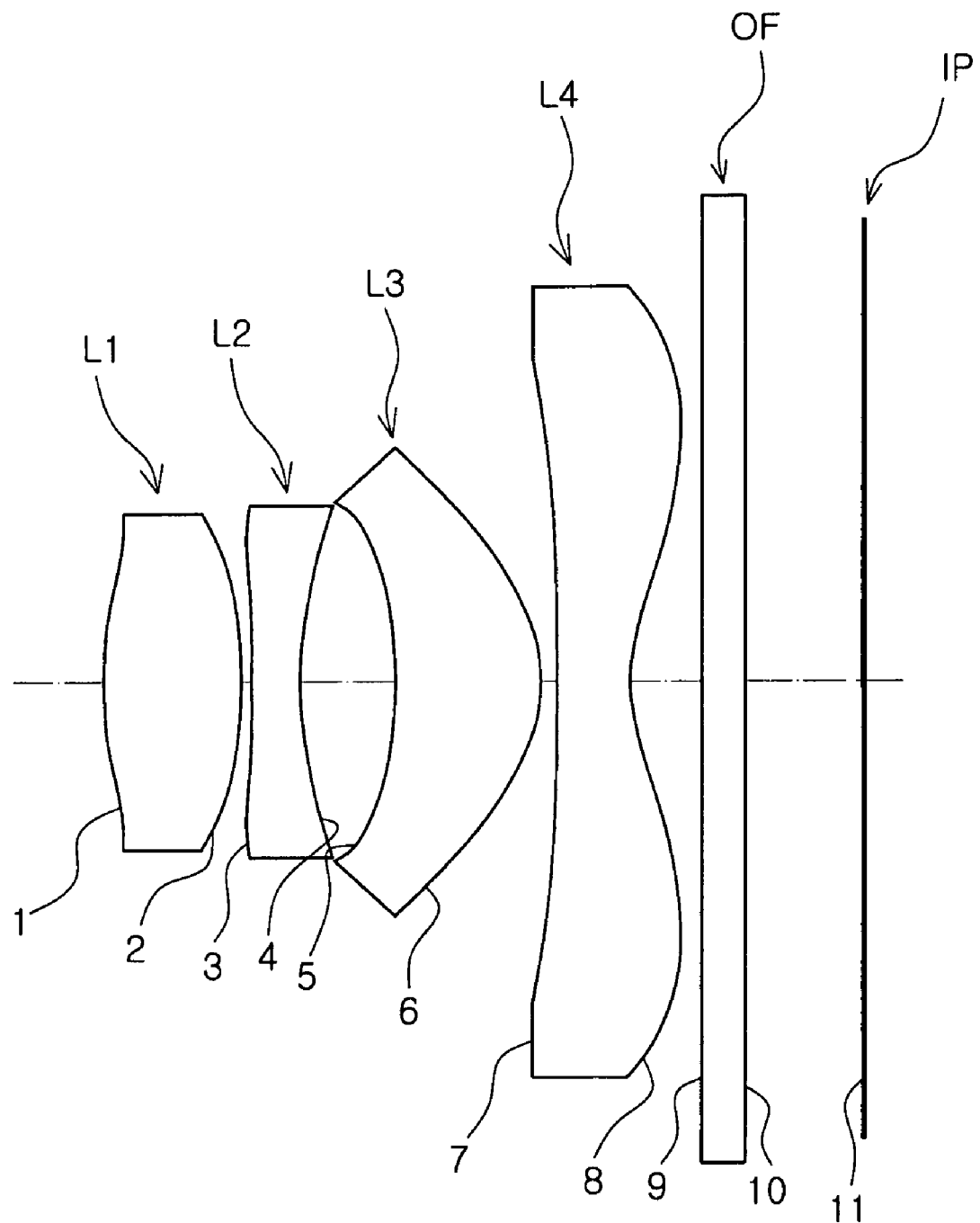
FIG. 10 is a lens configuration diagram of an optical system according to a fourth exemplary embodiment of the present invention.
Figure 11:
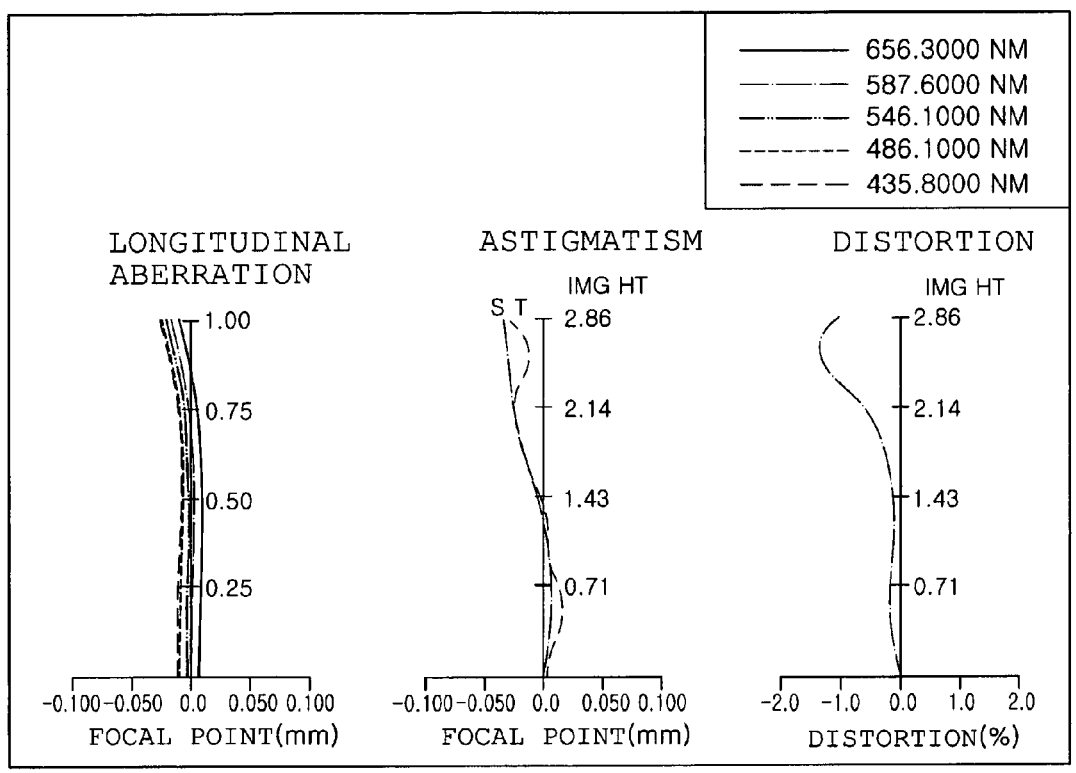
FIG. 11 is a graph analyzing longitudinal spherical aberrations, astigmatisms, and distortions of the optical system shown in FIG. 10.
Figure 12:
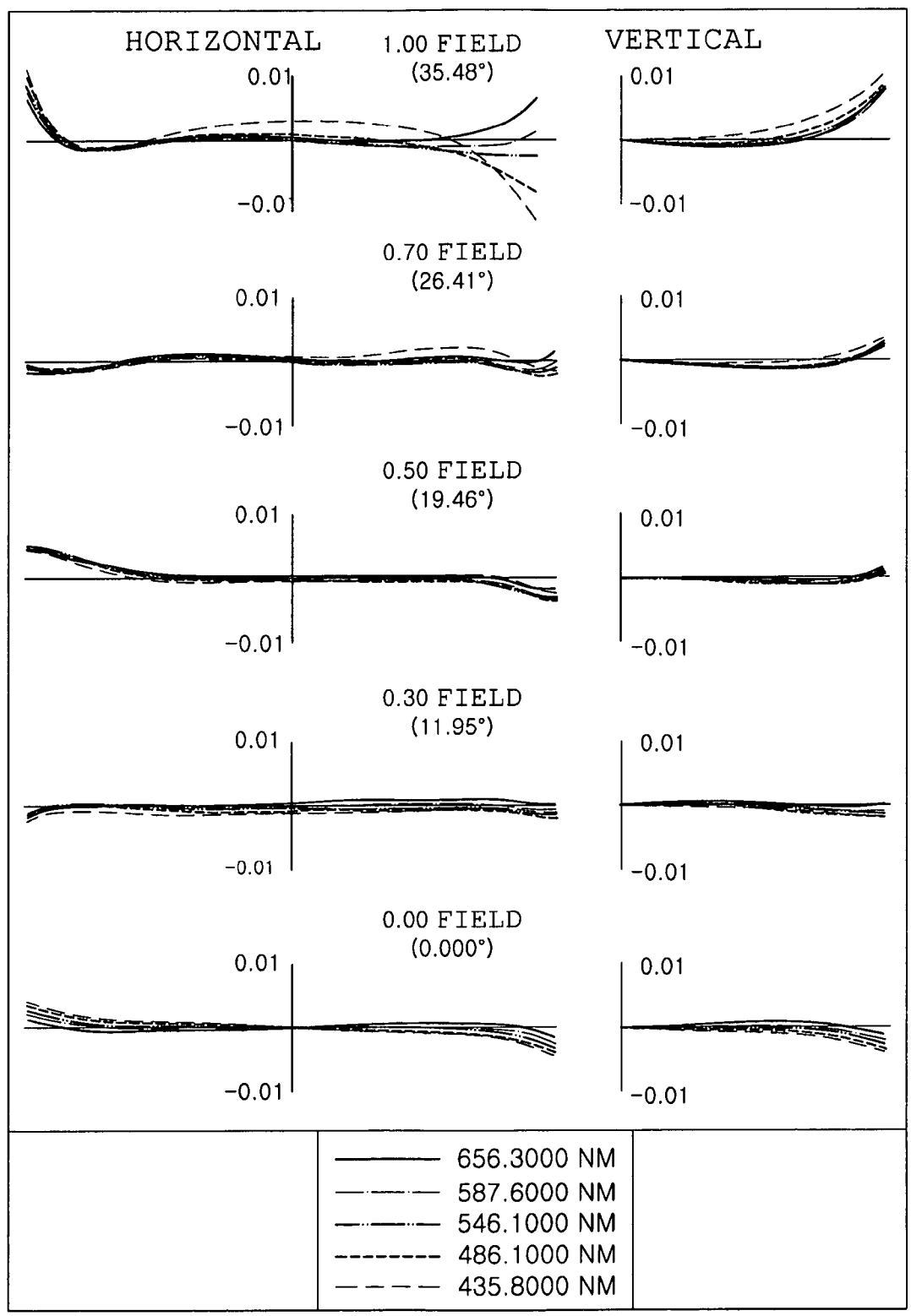
FIG. 12 is a graph analyzing transverse aberrations in a region in which a relative field height is 0.0 to 1.0 on an optical axis in tangential field curvature and a sagittal field curvature of the optical system shown in FIG. 10.

The following Table 7 represents an example of the numerical value of an optical system according to a fourth exemplary embodiment. In addition, FIG. 10 is a lens configuration diagram of an optical system according to a fourth exemplary embodiment of the present invention, FIG. 11 is a graph analyzing longitudinal spherical aberrations, astigmatisms, and distortions of the optical system shown in Table 7 and FIG. 10, and FIG. 12 is a graph analyzing transverse aberrations in a region in which a relative field height is 0.0 to 1.0 on an optical axis in tangential field curvature and a sagittal field curvature of the optical system shown in Table 7 and FIG. 10.

In the case of the fourth exemplary embodiment, a distance TL from the surface 1 of the object of the first lens L1 to an upper surface 11 represents 5.423 mm, the entire focal distance F of the optical system represents 4.046 mm, the focal distances f1, f2, f3, and f4 between the first lens L1 to the fourth lens L4 each represent 2.767 mm, −4.204 mm, 1.654 mm, and −1.658 mm.

TABLE 5

| Surface Number | Curvature Radius (rn) | Thickness or Distance (t) | Refractive Index (Nd) | Abbe's Number (Vd) | Remarks |
|---|---|---|---|---|---|
| 1 | 2.2220 | 0.940 | 1.5346 | 56.27 | First Lens |
| 2 | −4.4230 | 0.120 | | | |
| 3 | −7.8430 | 0.380 | 1.6142 | 25.60 | Second Lens |
| 4 | 4.7035 | 0.625 | | | |
| 5 | −2.6223 | 1.000 | 1.5346 | 56.27 | Third Lens |
| 6 | −0.7874 | 0.100 | | | |
| 7 | −50.0000 | 0.590 | 1.5346 | 56.27 | Fourth Lens |
| 8 | 0.9523 | 0.500 | | | |
| 9 | ∞ | 0.300 | 1.5168 | 64.20 | Optical Filter |
| 10 | ∞ | 0.845 | | | |
| 11 | ∞ | 0.000 | | | Upper Surface |

The non-spherical coefficient values of the third exemplary embodiment according to Equation 1 depend on the follow Table 6.

TABLE 7

| Surface Number | Curvature Radius (rn) | Thickness or Distance (t) | Refractive Index (Nd) | Abbe's Number (Vd) | Remarks |
|---|---|---|---|---|---|
| 1 | 2.5676 | 0.960 | 1.5346 | 56.27 | First Lens |
| 2 | −3.0265 | 0.080 | | | |
| 3 | −1000.0000 | 0.360 | 1.6142 | 25.60 | Second Lens |
| 4 | 2.5888 | 0.680 | | | |
| 5 | −2.7504 | 1.050 | 1.5346 | 56.27 | Third Lens |
| 6 | −0.7573 | 0.100 | | | |
| 7 | −100.0000 | 0.540 | 1.5346 | 56.27 | Fourth Lens |
| 8 | 0.8946 | 0.500 | | | |
| 9 | ∞ | 0.300 | 1.5168 | 64.20 | Optical Filter |
| 10 | ∞ | 0.853 | | | |
| 11 | ∞ | 0.000 | | | Upper Surface |

The non-spherical coefficient values of the fourth exemplary embodiment according to Equation 1 depend on the follow Table 8.

TABLE 6

| Surface Number | K | A | B | C | D | E | F |
|---|---|---|---|---|---|---|---|
| 1 | −2.56753 | 1.10706E−02 | −9.24467E−03 | −4.13929E−02 | 3.48276E−02 | −3.46082E−02 | |
| 2 | 0.59802 | −1.42160E−01 | 7.41628E−03 | 1.68080E−02 | −8.47193E−03 | | |
| 3 | 0.00000 | −1.65772E−01 | 2.45100E−02 | 5.91927E−02 | −3.54932E−03 | | |
| 4 | 0.00000 | −3.75275E−02 | 1.86193E−02 | 2.31498E−03 | 0.00000E+00 | | |
| 5 | 4.00000 | −9.54074E−03 | 9.90005E−03 | −4.47008E−02 | 2.14322E−02 | | |
| 6 | −3.34232 | −1.39238E−01 | 8.98261E−02 | −6.00208E−02 | 1.39190E−02 | 7.21134E−04 | |
| 7 | 1.00000 | −7.76444E−03 | −2.29388E−02 | 1.06764E−02 | −1.48604E−03 | | |
| 8 | −6.83840 | −5.19637E−02 | 1.46248E−02 | −4.11348E−03 | 6.54832E−04 | −4.52398E−05 | |

TABLE 8

| Surface Number | K | A | B | C | D | E | F |
|---|---|---|---|---|---|---|---|
| 1 | −3.63753E+00 | 2.68279E−03 | −1.92763E−02 | −1.69256E−02 | 1.27443E−02 | −1.41692E−02 | |
| 2 | −9.38331E+00 | −9.57386E−02 | 3.25068E−02 | −2.86660E−02 | 1.19742E−02 | | |
| 3 | 0.00000E+00 | −7.45414E−02 | 2.88820E−02 | 1.08382E−02 | 5.89739E−03 | | |
| 4 | 0.00000E+00 | −3.79451E−02 | 1.43809E−02 | 2.00116E−04 | | | |
| 5 | 4.52336E+00 | −3.20664E−02 | 7.59579E−02 | −7.15102E−02 | 3.02799E−02 | | |
| 6 | −3.42570E+00 | −1.58378E−01 | 1.27392E−01 | −7.84518E−02 | 2.31934E−02 | −2.16503E−03 | |
| 7 | −7.16756E−12 | −1.95365E−03 | −7.60036E−03 | 2.42684E−03 | −2.17645E−04 | | |
| 8 | −6.66125E+00 | −4.51404E−02 | 1.33336E−02 | −3.32240E−03 | 4.14448E−04 | −2.02402E−05 | |

It can be confirmed through the above exemplary embodiment that the optical system having the good correction state of the spherical aberrations, the astigmatisms, the distortions, and the transverse aberrations as shown in FIGS. 2, 3, 5, 6, 8, 9, 11, and 12 can be obtained. Meanwhile, the values of Conditional Expressions 1 to 8 for the first to fourth exemplary embodiments are represented in the following Table 9.

TABLE 9

| | First Exemplary Embodiment | First Exemplary Embodiment | First Exemplary Embodiment | First Exemplary Embodiment |
|---|---|---|---|---|
| Conditional Expression 1 | −1.646 | −1.516 | −1.671 | −1.663 |
| Conditional Expression 2 | −2.813 | −3.285 | −2.822 | −3.391 |
| Conditional Expression 3 | 0.235 | 0.247 | 0.242 | 0.259 |
| Conditional Expression 4 | 30.67 | 30.67 | 30.67 | 30.67 |
| Conditional Expression 5 | 0.7332 | 0.6848 | 0.7034 | 0.6838 |
| Conditional Expression 6 | −1.2273 | −1.0542 | −1.1441 | −1.0389 |
| Conditional Expression 7 | 0.4427 | 0.4522 | 0.4276 | 0.4088 |
| Conditional Expression 8 | −0.4454 | −0.4517 | −0.4208 | −0.4097 |

It can be confirmed from the above Table 9 that the first to fourth exemplary embodiments of the present invention satisfy the Conditional Expressions 1 to 8.

As set forth above, the present invention satisfactorily maintains the correction state of the spherical aberrations, the astigmatisms, the distortions, and the transverse aberrations, while forming the wide angle of view of the optical system, thereby making it possible to obtain images having excellent qualities, such as high resolution, high definition, and the like, While the present invention has been shown and described in connection with the exemplary embodiments, it will be apparent to those skilled in the art that modifications and variations can be made without departing from the spirit and scope of the invention as defined by the appended claims.

What is claimed is:

1. An optical system, comprising:
   a first lens having positive refractive power, with both surfaces thereof being convex;
   a second lens having negative refractive power, with both surfaces thereof being concave;
   a third lens having positive refractive power and a meniscus shape; and
   a fourth lens having negative refractive power, with both surfaces thereof being concave, all of which are disposed in order from an object to a front upper surface,
   wherein the refractive powers of the first lens to the fourth lens satisfy the following Conditional Expressions 1 and 6:

$$\frac{f1}{f4} < -1.1, \text{ and} \qquad \text{Conditional Expression 1}$$

$$-1.5 < \frac{f2}{F} < -0.7 \qquad \text{Conditional Expression 6}$$

and $$-1.5 < \frac{f2}{F} < -0.7, \qquad \text{Conditional Expression 6}$$

where f1 is the focal distance of the first lens, f is the focal distance of the fourth lens, f2 is the focal distance of the second lens, and F is the entire focal distance of the optical system.

2. The optical system of claim 1, wherein the shapes of the first lens and the third lens satisfy the following Conditional Expression 2:

$$\frac{r1}{r6} < -2.0, \qquad \text{Conditional Expression 2}$$

where r1 is a curvature radius of the object surface of the first lens and r6 is a curvature radius of the upper side of the third lens.

3. The optical system of claim 1, wherein the shape of the third lens satisfies the following Conditional Expression 3:

$$\frac{t5}{F} > 0.2, \qquad \text{Conditional Expression 3}$$

where t5 is a thickness of an optical axis of the third lens and F is the entire focal distance of the optical system.

4. The optical system of claim 1, wherein the materials of the first lens and the second lens satisfy the following Conditional Expression 4:

$$V1 - V2 > 25 \qquad \text{Conditional Expression 4,}$$

where V1 is Abbe's number with relation to the first lens and V2 is Abbe's number with relation to the second lens.

5. The optical system of claim 1, wherein the refractive powers of the first lens and the fourth lens satisfy the following Conditional Expressions 5, 7 and 8:

$$0.4 < \frac{f1}{F} < 1.0,\quad \text{Conditional Expression 5}$$

$$0.1 < \frac{f3}{F} < 0.7, \text{ and}\quad \text{Conditional Expression 7}$$

$$-0.7 < \frac{f4}{F} < -0.1.\quad \text{Conditional Expression 8}$$

where f1 is a focal distance of the first lens, f3 is a focal distance of the third lens, f is a focal distance of the fourth lens, and F is the entire focal distance of the optical system.

6. The optical system of claim 1, further comprising an aperture stop disposed in front of the object of the first lens.

\* \* \* \* \*

UNITED STATES PATENT AND TRADEMARK OFFICE
CERTIFICATE OF CORRECTION

PATENT NO.         : 8,264,784 B2                                          Page 1 of 1
APPLICATION NO.    : 12/929370
DATED              : September 11, 2012
INVENTOR(S)        : Ho Sik You It is certified that error appears in the above-identified patent and that said Letters Patent is hereby corrected as shown below:

In the Claims

In Column 12, Lines 21-26 (Approx.), In Claim 1, below "Conditional Expression 1", delete " $-1.5 < \dfrac{f2}{F} < -0.7$     Conditional Expression 6 and                                   ".

In Column 12, Line 32 (Approx.), In Claim 1, delete "f" and insert -- f4 --, therefor.
In Column 13, Line 6, In Claim 5, delete "-0.1." and insert -- -0.1, --, therefor.
In Column 14, Line 2, In Claim 5, delete "f" and insert -- f4 --, therefor.

Signed and Sealed this
Twenty-eighth Day of October, 2014

Michelle K. Lee
*Deputy Director of the United States Patent and Trademark Office*